(12) United States Patent
Chamayou et al.

(10) Patent No.: US 8,802,794 B2
(45) Date of Patent: *Aug. 12, 2014

(54) INTERLOCK AND PROCESS

(75) Inventors: Jean-Louis Chamayou, Carry le Rouet (FR); Gregori Patrick Liotard, Gignac-la-Nerthe (FR); Kevin Peter Ramsay, Livingston (GB)

(73) Assignee: Ineos Commercial Services UK Limited, Hampshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/700,540

(22) PCT Filed: Jun. 28, 2011

(86) PCT No.: PCT/EP2011/060787
§ 371 (c)(1),
(2), (4) Date: Nov. 28, 2012

(87) PCT Pub. No.: WO2012/004153
PCT Pub. Date: Jan. 12, 2012

(65) Prior Publication Data
US 2013/0079476 A1 Mar. 28, 2013

(30) Foreign Application Priority Data
Jul. 8, 2010 (EP) .................................. 10168855

(51) Int. Cl.
| | | |
|---|---|---|
| *F16B 39/28* | (2006.01) | |
| *C08F 2/00* | (2006.01) | |
| *C08F 110/02* | (2006.01) | |
| *C08F 110/06* | (2006.01) | |
| *B01J 19/00* | (2006.01) | |
| *B01J 8/00* | (2006.01) | |
| *G05B 17/00* | (2006.01) | |
| *B65D 88/54* | (2006.01) | |
| *F26B 25/00* | (2006.01) | |
| *C08F 6/00* | (2006.01) | |
| *C08F 2/01* | (2006.01) | |

(52) U.S. Cl.
CPC . *C08F 2/01* (2013.01); *B01J 19/00* (2013.01); *B01J 2219/00207* (2013.01); *B01J 8/00* (2013.01); *B01J 19/002* (2013.01); *G05B 17/00* (2013.01); *B01J 2219/00213* (2013.01); *B65D 88/54* (2013.01); *B01J 8/0035* (2013.01); *F26B 25/00* (2013.01); *B01J 2208/00044* (2013.01); *B01J 2219/00225* (2013.01); *B01J 2208/00761* (2013.01); *B01J 2219/00268* (2013.01); *B01J 2219/00236* (2013.01); *C08F 6/005* (2013.01); *B01J 8/0015* (2013.01)
USPC .............. 526/61; 526/352; 526/351; 411/110

(58) Field of Classification Search
USPC ............................. 526/61, 351, 352; 422/110
See application file for complete search history.

(56) References Cited

U.S. PATENT DOCUMENTS

| | | | |
|---|---|---|---|
| 3,257,375 A | 6/1966 | Norwood | |
| 6,255,411 B1 | 7/2001 | Hartley et al. | |
| 2009/0124779 A1* | 5/2009 | Cousin et al. | 526/348 |
| 2013/0072644 A1* | 3/2013 | Chamayou et al. | 526/61 |
| 2013/0072653 A1* | 3/2013 | Chamayou et al. | 526/351 |

FOREIGN PATENT DOCUMENTS

| | | |
|---|---|---|
| EP | 1 914 246 A1 | 4/2008 |
| EP | 1 914 248 A1 | 4/2008 |
| EP | 1 914 249 A1 | 4/2008 |
| EP | 1 914 250 A1 | 4/2008 |
| EP | 2 030 757 A1 | 3/2009 |
| EP | 2 172 494 A1 | 4/2010 |
| WO | WO 93/13843 A1 | 7/1993 |
| WO | WO 02/12353 A1 | 2/2002 |
| WO | WO 2004/039848 A1 | 5/2004 |
| WO | WO 2008/024517 A2 | 2/2008 |
| WO | WO 2008/024517 A3 | 2/2008 |

OTHER PUBLICATIONS

Specification of Co-pending U.S. Appl. No. 13/700,597, filed Nov. 28, 2012, 20 pgs.
Choi, K.Y., et al; "The Dynamic Behavior of Continuous Stirred-Bed Reactors for the Solid Catalyzed Gas Phase Polymerization of Propylene"; *Chemical Engineering Science*, vol. 43, No. 10; pp. 2587-2604 (1988) XP-002610731.
PCT International Search Report; International Application No. PCT/EP2011/060791, mailed Sep. 13, 2011 (3 pgs).
Specification of Co-pending U.S. Appl. No. 13/700,855, filed Nov. 29, 2012, 17 pgs.
PCT International Search Report; International Application No. PCT/EP2011/060793, mailed May 10, 2011 (2 pgs).

* cited by examiner

*Primary Examiner* — William Cheung
(74) *Attorney, Agent, or Firm* — Nixon & Vanderhye, P.C.

(57) ABSTRACT

Interlock for use in a process for degassing of a polymer powder in a degassing vessel. The interlock includes the steps of 1. measuring the temperature of the polymer powder within or exiting the degassing vessel, 2. comparing the measurement value to a threshold value in order to ascertain whether it is lower than the threshold value or not, and 3. if the measured temperature is lower than the threshold value taking one or more actions to reduce the concentration of hydrocarbons in the polymer powder exiting the degassing vessel and/or to stop the polymer powder withdrawal from that degassing vessel.

12 Claims, No Drawings

INTERLOCK AND PROCESS

This application is the U.S. national phase of International Application No. PCT/EP2011/060787 filed 28 Jun. 2011 which designated the U.S. and claims priority to European Patent Application No. 10168855.4 filed 8 Jul. 2010, the entire contents of each of which are hereby incorporated by reference.

The present invention relates to the degassing of polymer powder.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

In a slurry polymerisation process the polymerisation is conducted in a stirred tank or, preferably, a continuous loop reactor comprising mainly polyolefin, hydrocarbon diluent and a catalyst for the polymerisation. Polymer product is removed from the reactor in the form of a slurry in the diluent.

The polymer product removed from the reactor in a polymerisation process may contain unreacted monomers and other hydrocarbon species (for example, hydrogen, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

The removal of monomer and other residual hydrocarbons, which may be in gaseous or liquid form, is generally referred to as "degassing". One method that may be used is to contact the produced polymer with a gas in a purge vessel, usually a counter-currently flowing inert gas, such as nitrogen. This is generally referred to as "purging". Another method which can be used is to subject the polymer to a pressure reduction, usually on entry to a suitable vessel, with the result that at least a portion of any hydrocarbons in liquid form vaporise. This step may be referred to as "flashing". Such methods may also be combined e.g. a pressure reduction and a purge gas may be applied in the same degassing vessel.

There are a number of prior art patents which describe methods for the removal of such hydrocarbons from the products of gas phase and slurry processes including one or more of such steps, such as U.S. Pat. No. 4,372,758, EP 127253, U.S. Pat. No. 5,376,742 and WO 02/88194.

U.S. Pat. No. 4,372,758, for example, describes a process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

The general teaching of the above is that increased removal of residual monomers can be achieved by increasing the temperature of the polymer powder (fluff) entering a purge vessel and/or the temperature of the purge gas, increasing the polymer residence time and/or increasing the purge gas flow rate.

The degassing vessels are generally operated in order for the residual monomer level in the polymer to be reduced to desired levels prior to downstream treatment/processing. In particular, it is necessary to ensure that at the end of any degassing steps the residual hydrocarbon content is below any unsafe or environmentally unacceptable levels downstream. Although the degassing requirements can be determined experimentally or by past process experience for any particular polymer, the relationships are generally complex, and hence some form of measurement is required to ensure the required degassing.

In general, the degassing vessel will have interlocks which cause the degassing process to be stopped if a "major" disruption occurs, for example, a loss of purge gas flow.

Whilst potentially serious, such problems are generally relatively easy to detect. More difficult to detect can be more subtle fluctuations in the overall process, such that the polymer powder exiting the degassing vessel comprises more residual hydrocarbons than desired.

It is possible to analyse the atmosphere above the polymer in downstream silos to determine the amount of residual hydrocarbons and ensure this is below a safe level. However, this inherently has a significant time lag after the polymer removal from the degassing system before any problem is detected. As well as leading to a potentially unsafe situation (high residual hydrocarbon content) in the storage silo, it can also mean a large quantity of polymer which has to be degassed further. Since it is very unusual to have a further degassing vessel available this may involve sending the polymer back to the original degassing vessel, which is often just not physically possible or is to the detriment of degassing of "current" production.

Also, such a system is of no use where the degassed polymer is to be passed directly to further processing, such as extrusion processing, rather than storage, and this can lead to a risk of unsafe levels of residual hydrocarbons in such equipment.

For the above reasons it is also known to analyse the gas exiting a degassing vessel using gas chromatography (GC) to determine the amount of volatiles therein.

However, GC's are expensive items of kit and are prone to unreliability. It therefore becomes necessary to have redundant GC's, despite their cost. Further, GC analysis can still take a significant amount of time (5-10 min between samplings not being untypical) which also leads to a lag in potential response time. At the throughputs of commercial polymerisation units a significant amount of polymer which has not been effectively degassed can still exit the degassing vessel before any problem is detected by such systems.

We have now found an improved system for indicating an increase in residual hydrocarbon content in the polymer exiting a degassing vessel. The improved system provides a reliable indication of an increase in hydrocarbon exiting a degassing vessel, and is both rapid and simple to implement.

Thus, in a first aspect, the present invention provides an interlock for use in a process for degassing of a polymer powder in a degassing vessel, which interlock comprises:

1. measuring the temperature of the polymer powder within or exiting the degassing vessel,
2. comparing said measured value to a threshold value in order to ascertain whether it is lower than the threshold value or not, and
3. if the measured temperature is lower than said threshold value taking one or more actions to reduce the concentration of hydrocarbons in the polymer powder exiting the degassing vessel and/or to stop the polymer powder withdrawal from the degassing vessel.

The present invention also provides a process for the degassing of a polymer powder in a degassing vessel using said interlock.

Thus, in a second aspect, the present invention provides a process for the degassing of the polymer powder in a degassing vessel, which process comprises:

a. measuring the temperature of the polymer powder within or exiting the degassing vessel,
b. comparing said measured value to a threshold value in order to ascertain whether it is lower than the threshold value or not, and
c. if the measured temperature is lower than said threshold value taking one or more actions to reduce the concentration of hydrocarbons in the polymer powder exiting the degassing vessel and/or to stop the polymer powder withdrawal from the degassing vessel.

As noted above, the concept of interlocks is known. In general terms interlocks may be provided for either safety or other operational reasons in a process. The present invention, however, relates to an "interlock" which relates to safety and as such the term "interlock" as used herein means an instrumented system which is designed to act in response to a condition within a process which indicates a potentially dangerous situation or consequence, and to thereby prevent or mitigate said situation or consequence.

Thus, the interlock monitors the process over time to check whether or not the condition does indicate a potentially dangerous situation or consequence, and if the condition does indicate such a situation or consequence the interlock will act to prevent or mitigate said situation or consequence.

It should also be noted that an interlock tends to only act on the basis of whether a defined condition is or is not met i.e. the monitored condition either does indicate a potentially dangerous situation or consequence, in which case the interlock will act, or it does not, in which case the interlock will not act. Thus, whilst, in general, interlocks can act on a process condition, such as temperature or pressure, this is in addition to, and usually will override as necessary, more general "steady state" process control based on such parameters. Further, the defined condition will usually be a condition outside normal operating ranges. For example, in the present invention the threshold value will be outside of (below) the normal range of temperature expected for the polymer powder during degassing of said powder.

Another feature of "interlocks" is that they generally require a "reset", usually a manual reset, once they have been triggered. Thus, once triggered, even if the condition which caused the interlock to be triggered no longer exists, the interlock needs to be reset before the interlock response can be turned off. As an example, in the present invention, if withdrawal of polymer powder from the degassing vessel has been stopped it does not automatically restart even if measured temperature increases above the threshold value.

In the present invention the extent of degassing in a degassing vessel is determined by measuring the temperature of the polymer powder within or exiting the degassing vessel.

The "degassing vessel" may be any vessel in which separation of monomer and/or other gaseous hydrocarbons from polymer takes place. In one example it may be a vessel conventionally referred to as a "flash vessel", where hydrocarbons which are in liquid form in the reactor are subject to a pressure reduction after removal from the reactor, causing vaporisation of the hydrocarbons, which are then separated from the polymer solids in the flash vessel. As another example the degassing vessel may be a vessel conventionally referred to as a "purge vessel", wherein hydrocarbons are separated from the produced polymer by contacting the polymer with a gas in the purge vessel, usually a counter-currently flowing inert gas, such as nitrogen.

The temperature may be measured within the degassing vessel. When measured within the degassing vessel the measurement should preferably be in the half of the degassing vessel closest to the polymer powder exit.

As used herein, the term "measuring the temperature of the polymer powder within or exiting the degassing vessel" also encompasses the measurement of a temperature which directly correlates to the polymer powder temperature. As a specific example, in a degassing vessel ("purge vessel") where polymer powder is contacted with a purge gas, the powder temperature at the base of the degassing vessel can also be measured by measurement of the temperature of the purge gas immediately after contact with the powder at the base of the degassing vessel; the man skilled in the art knows that given the very large surface area provided by a granular bed of polymer particles in such a degassing vessel, this bed acts as a very efficient heat exchanger and the purge gas temperature becomes in equilibrium with the powder temperature after a few centimeters of contact. Preferably the temperature of the polymer powder itself is measured.

Preferably the degassing vessel is a vertically orientated degassing vessel with the polymer powder outlet at the base and the temperature is measured in the lower half of the vessel, defined as a height of from 0 to 0.5×H, where H is the height of the degassing vessel measured from the polymer exit to the polymer inlet.

The exact location can be selected by the person skilled in the art to give a reliable measurement of the polymer powder temperature after degassing. For example, a vertically orientated degassing vessel usually comprises a cylindrical vessel with a cone at the base of the cylinder between the cylinder and the polymer powder outlet. The temperature measurement within the vessel may be at some point on the cone, or on the lower part of the cylinder. Where a purge gas is used a measurement below the purge gas inlet may be used, although it is also possible to measure temperature above the inlet.

In general terms, the preferred location is at a height of between 0.1 and 0.4×H, more preferably between 0.15 and 0.25×H. Measurement at a height within the degassing vessel but slightly above the exit is preferred to ensure that the temperature measurement means, such as a thermowell protruding into the vessel, does not affect the flow of polymer powder at the exit.

Alternatively, the temperature may be measured exiting the degassing vessel, by which is meant at or downstream of the exit of the degassing vessel. Preferably the temperature is measured immediately downstream of the exit, although it is also possible to measure the temperature further downstream of the exit as long as the measured temperature can be directly related to that of the powder at the exit of the degassing vessel. Again, the exact location can be selected by the person skilled in the art to give a reliable measurement of the polymer powder temperature exiting the degassing vessel.

The present invention is founded on the fact that the vaporisation of volatile hydrocarbons associated with the polymer powder results in a reduction in temperature of the polymer powder. It is thus expected that for a particular polymer powder temperature at the inlet of a degassing vessel a reduction in the temperature of the polymer powder exiting the degassing vessel indicates an increase in the amount of volatile hydrocarbons removed. Under otherwise controlled conditions (such as purge gas flow rate, pressure, temperature, polymer residence time), this also indicates that the amount of hydrocarbons to be degassed entering the degassing vessel must have increased. Further, under otherwise identical conditions, a lower powder temperature shifts the equilibrium between vaporised and non-vaporised hydrocarbons towards the non-vaporised hydrocarbons. Although more hydrocarbons have therefore been removed during the degassing, a reduced powder temperature indicates there will be an increase in the amount of residual hydrocarbons on the polymer powder exiting the degassing vessel.

Further, an increase in hydrocarbon removal from polymer in the degassing vessel also indicates an increase in the concentration of volatiles exiting the degassing vessel in gaseous form, which also need to be dealt with safely (for example removed from a purge gas to enable recycle of the purge gas).

The present invention is also based on the fact that controlling the key parameters that should ensure a good degassing performance (such as powder residence time, purge gas flow rate, purge gas purity and the like) is in itself not sufficient to ensure that the polymer powder at the end of the degassing step will have reached the desired hydrocarbon level. Indeed, process upsets can occur upstream of the degassing vessel, in particular in the polymerisation reactor, that will lead to an increased hydrocarbon absorption on the polymer entering the degassing vessel. The concentration of hydrocarbons can potentially be much higher than the design capability of that degassing vessel. A particular example of such an upset in the reactor is the drift of the means, usually gas chromatographs, used to control the hydrocarbon concentration in a reactor. This drift can be almost undetectable and, especially for "heavier" hydrocarbons (those having 6 or more, preferably 8 or more carbon atoms) where small changes can make large differences, by the time process operators realise that the drift has occurred a significant amount of polymer can have been produced and passed through the degassing vessel.

In general, for production of a particular polymer product the temperature in the reactor is maintained at, or at least as close as possible to, a particular value. For different polymer products different reaction temperatures may be desired. In certain embodiments, the temperature of the polymer powder entering the degassing vessel is approximately constant regardless of upstream temperature. This may be, for example, if heating is supplied to the polymer prior to the degassing vessel in order to ensure it enters the vessel at a particular temperature.

In other embodiments, the temperature of the polymer entering the degassing vessel may vary depending on the upstream process, and in particular it may vary with the temperature of the polymerisation reaction.

In either case, it is possible to also measure the temperature of the polymer powder entering the degassing vessel and using the measured temperature values at the entry and exit to determine a temperature differential during degassing.

The threshold value of the present invention is a temperature value representative of a desired extent of polymer degassing. In operation of the present invention the measured temperature is compared to the threshold value in order to ascertain whether it is below the threshold value or not.

The threshold value for the polymer powder exiting the degassing vessel can be calculated by the person skilled in the art. This could be, for example, based on previous operating experience on the typical temperature variations in degassing of a particular polymer powder and/or margins in hydrocarbon residuals the operator is prepared to accept.

The variations acceptable by a particular operator may also depend on the relative efficiency and capacity of the subsequent process steps to deal with increases in hydrocarbons exiting the degasser.

In one example, the threshold value may be defined based on a minimum difference from the expected temperature under normal operating conditions, for example 10° C. lower.

The expected temperature of a polymer exiting a degassing vessel can be calculated for a particular polymer powder temperature entering the degassing vessel based on the amount and species of volatile components to be removed, and other parameters such as the residence time and the purge gas flow rate and purity, and/or pressure drop. The value may be determined, for example, using a model such as that in WO 2008/024517 or based on previous operating experience. The threshold value can alternatively be a value determined during the design phase, below which it has been demonstrated that it corresponds to an excessive hydrocarbons loading arriving into the degassing vessel, indicating therefore a drift in the control of the plant upstream of the degassing vessel (for example a drift of the control chromatographs in the reactor as noted before).

The threshold value may be adjusted depending on the polymer to be degassed. For example, the threshold value may vary depending on the reactions conditions, including the hydrocarbons present in the polymerisation reaction.

In one embodiment, the threshold value may be defined by a fixed temperature differential between upstream process conditions (such as the polymerisation reaction temperature or the temperature of the polymer powder entering the degassing vessel) and the temperature of the polymer powder within or exiting the degassing vessel. For example, the threshold value may be adjusted if reaction temperature is changed in order to maintain a fixed differential to the reaction temperature. In this scenario, if the measured differential is greater than the desired (fixed) differential this directly indicates that the polymer powder temperature is lower than the threshold value, and corrective action should be taken. This approach simplifies the implementation of the interlock.

The present invention is particularly useful when removing relatively heavy components, in particular comonomers having 6 or more carbon atoms or inert hydrocarbons having 5 or more carbon atoms, from a polymer powder. Being "heavy" such materials are relatively more difficult to degas, and small changes in the amount entering the degassing vessel can make relatively large differences in the amount of residual hydrocarbons at the exit.

Where the measured temperature is lower than the threshold value one or more actions are taken to reduce the concentration of hydrocarbons in the polymer powder exiting the degassing vessel and/or to stop withdrawal of the polymer powder from the degassing vessel.

In one embodiment withdrawal of the polymer powder from the degassing vessel is stopped. Withdrawal of polymer powder from the degassing vessel is usually restarted once the increase in hydrocarbon absorption on the polymer entering the degassing vessel is reversed, for example by correction of the upstream change which caused the increase. In general withdrawal may be stopped for a short period of time without stopping flow into the degassing vessel. If the cause of the original change is corrected in a short enough time then it need not be necessary to stop the flow into the degassing vessel. However, the level of polymer powder in the degassing vessel will increase whilst no withdrawal occurs, and if the original cause cannot be corrected in a short enough time then it will become necessary to stop flow into the degassing vessel. This may be achieved by stopping withdrawal from upstream vessels, such as upstream degassing vessels, if present, or the reactor.

As used herein, "taking one or more actions to stop the polymer powder withdrawal from the degassing vessel" means that polymer does not pass from the degassing vessel to downstream equipment. Generally, polymer withdrawal from the degassing vessel is stopped completely, but in some embodiments, especially where withdrawal to downstream equipment may otherwise be stopped for a significant period of time, it may be preferred to maintain movement of polymer in the degassing vessel by withdrawing a portion of the polymer from a lower part the degassing vessel and returning it at an upper part of the degassing vessel.

Suitable actions to reduce the concentration of hydrocarbons in the polymer powder exiting the degassing vessel include any which would further increase the amount of hydrocarbons being removed in the degassing vessel in order to re-attain the desired concentration of hydrocarbons in the polymer powder exiting the degassing vessel and actions which correct the upstream change that has led to the situation.

Non-limiting examples of methods which would further increase the amount of hydrocarbons being removed in the degassing vessel include increasing the flow rate and/or temperature of any purge gas entering the degassing vessel, increasing the residence time of the polymer powder in the degassing vessel and increasing the temperature of the polymer powder entering the degassing vessel. Such methods would usually be applied until the increase in hydrocarbon absorption on the polymer entering the degassing vessel is reversed, for example by correction of the upstream change.

Non-limiting examples of methods which might correct the upstream change include changing the composition in the reactor and recalibrating upstream chromatographs, or changing the chromatograph used for control to a spare (if available).

In one embodiment, the increase in hydrocarbon absorption on the polymer entering the degassing vessel may be due to a lower than desirable or intended temperature in the reaction vessel. This would lead to greater levels of absorbed hydrocarbon on the polymer particles being withdrawn, and hence on the polymer entering the degassing vessel. In this case, correction may be to increase the reaction temperature.

The interlock according to the present invention can also be provided with a temporary override that will allow actions to be taken even when the triggering condition might otherwise be met. For example, in the present invention the interlock may be overridden so that withdrawal may be allowed after a long outage where the polymer powder has cooled in the degasser (and thus is below the threshold value).

The present invention is applicable to any process which requires the degassing of polymer powder particles. For example, and preferably, the polymer powder particles to be degassed may be obtained from a gas phase polymerisation process or a slurry polymerisation process. Preferably, the polymer powder particles are polyethylene or polypropylene formed by polymerisation of ethylene or propylene respectively with one or more comonomers, most preferably comonomers having 6 or more carbon atoms.

An example of a gas phase polymerisation process in a horizontally disposed reactor vessel can be found in U.S. Pat. No. 4,921,919. Preferred gas phase processes are fluidised bed gas phase processes in vertically orientated reactors, such as described in U.S. Pat. No. 5,376,742.

An example of a suitable slurry process is that found in WO 2008/024517.

The present invention is preferably applied to a degassing vessel in which polymer is contacted with a purge gas, usually a counter-currently flowing inert gas such as nitrogen, to remove monomers and other entrained hydrocarbons. Such a vessel is herein referred to as a "purge vessel" The removal of hydrocarbons in such a purge vessel may also be assisted by a pressure reduction relative to the upstream part of the process.

The present invention is particularly applicable to an overall two-stage degassing process with a first degassing vessel at a relatively elevated pressure compared to a subsequent second degassing vessel at a relatively lower pressure. The majority of entrained monomers and other hydrocarbons, including diluents in a slurry polymerisation process, are preferably removed in the first degassing vessel at elevated pressure, and hence require reduced compression to recycle to the polymerisation process. In such an embodiment preferably at least one, and more preferably both, of the vessels are purge vessels. In such an embodiment the present invention may be applied to either or both degassing vessels. Most preferably, the process is applied to the first degassing vessel, which is preferably a purge vessel, in such a system, and comprises measuring the temperature of the polymer powder at the exit of first degassing vessel. A low temperature indicates a higher amount of degassing than expected in the first degassing vessel, but also a higher than expected residual hydrocarbon content in polymer and vapours exiting the first degassing vessel as described above. The present invention will be illustrated by reference to the following examples:

EXAMPLES

Example 1

Ethylene and 1-butene were reacted in a fluidised bed polymerisation reactor having a diameter of 5 m, in a fluidised bed having a height of 20 m and using a commercially available Ziegler-Natta catalyst to produce a polyethylene product having a non-annealed density of 918 and a melt index ($MI_{2.16}$) of 0.9. Reactor temperature was 88° C.

Polymer product was withdrawn from the reactor at a rate equivalent to 49 te/hr of polymer powder, which was passed to a degassing process comprising two separate degassing vessels.

The process control system had a safety interlock based on the measured temperature at the exit of the second degassing vessel. Based on a process model, itself based on previous operating experience, the temperature of polymer powder at the exit of the second degassing vessel was expected to be 74.7° C.

Based on this expected value, the threshold value for the temperature on the second degassing vessel was set to 63° C., and the process was operated whilst the control system monitored that the measured temperature did not fall below the threshold value.

Example 2

Example 1 was repeated except to produce a polyethylene product having a non-annealed density of 923 and a melt index ($MI_{2.16}$) of 50. Reactor temperature in this example was 85° C.

In this example the temperature of polymer powder at the exit of the second degassing vessel was expected to be 68.4° C. and the threshold value for the temperature on the second degassing vessel was set to 55° C.

The invention claimed is:

1. An interlock for use in a process for degassing of a polymer powder in a degassing vessel, which interlock is an instrumented system which is designed to act in response to a condition within a process which indicates a potentially dangerous situation or consequence, and to thereby prevent or mitigate said situation or consequence, which interlock comprises the capabilities of:
    1. measuring the temperature of the polymer powder within or exiting the degassing vessel,
    2. comparing said measured value to a threshold value in order to ascertain whether it is lower than the threshold value or not, which threshold value is a temperature value representative of a desired extent of polymer degassing and is below the normal range of temperature expected for the polymer powder during degassing of said powder, and
    3. if the measured temperature is lower than said threshold value taking one or more actions to reduce the concentration of hydrocarbons in the polymer powder exiting the degassing vessel and/or to stop the polymer powder withdrawal from the degassing vessel.

2. An interlock according to claim 1 wherein the powder temperature is measured within the degassing vessel and in the half of the degassing vessel closest to the polymer powder exit.

3. An interlock according to claim 1 wherein the degassing vessel is a purge vessel in which polymer is contacted with a purge gas to remove monomers and other entrained hydrocarbons, and the powder temperature is measured by measurement of the temperature of the purge gas after contact with the polymer powder.

4. An interlock according to claim 1 wherein the threshold value is adjusted depending on the polymer to be degassed and is defined by a fixed temperature differential between an upstream process condition and the temperature of the polymer powder within or exiting the degassing vessel.

5. An interlock according to claim 4 wherein the threshold value is adjusted if reaction temperature is changed in order to maintain a fixed differential to the reaction temperature.

6. An interlock according to claim 1 wherein the one or more actions to reduce the concentration of hydrocarbons in the polymer powder exiting the degassing vessel include increasing the flow rate and/or temperature of any purge gas entering the degassing vessel, increasing the residence time of the polymer powder in the degassing vessel and increasing the temperature of the polymer powder entering the degassing vessel.

7. A process for the degassing of the polymer powder in a degassing vessel, which process comprises using the interlock according to claim 1.

8. A process according to claim 7 wherein the polymer powder particles to be degassed are obtained from a gas phase polymerisation process or a slurry polymerisation process.

9. A process according to claim 7 wherein the polymer powder particles are polyethylene or polypropylene formed by polymerisation of ethylene or propylene respectively with one or more comonomers.

10. A process according to claim 7 wherein the degassing vessel is a purge vessel in which polymer is contacted with a purge gas to remove monomers and other entrained hydrocarbons.

11. A process according to claim 7 wherein degassing vessel in which the interlock is applied is one in an overall two-stage degassing process with a first degassing vessel at a relatively elevated pressure compared to a subsequent second degassing vessel at a relatively lower pressure.

12. A process according to claim 11 wherein the degassing vessel in which the interlock is applied is the first degassing vessel.

* * * * *

UNITED STATES PATENT AND TRADEMARK OFFICE
CERTIFICATE OF CORRECTION

PATENT NO.       : 8,802,794 B2
APPLICATION NO.  : 13/700540
DATED            : August 12, 2014
INVENTOR(S)      : Chamayou et al.

Page 1 of 1

It is certified that error appears in the above-identified patent and that said Letters Patent is hereby corrected as shown below:

Title Page, Item "[73] Assignee", please delete "Ineos Commercial Services UK Limited." and insert --Ineos Sales (UK) Limited--.

Signed and Sealed this
Twenty-first Day of April, 2015

Michelle K. Lee
*Director of the United States Patent and Trademark Office*